Figure 1:
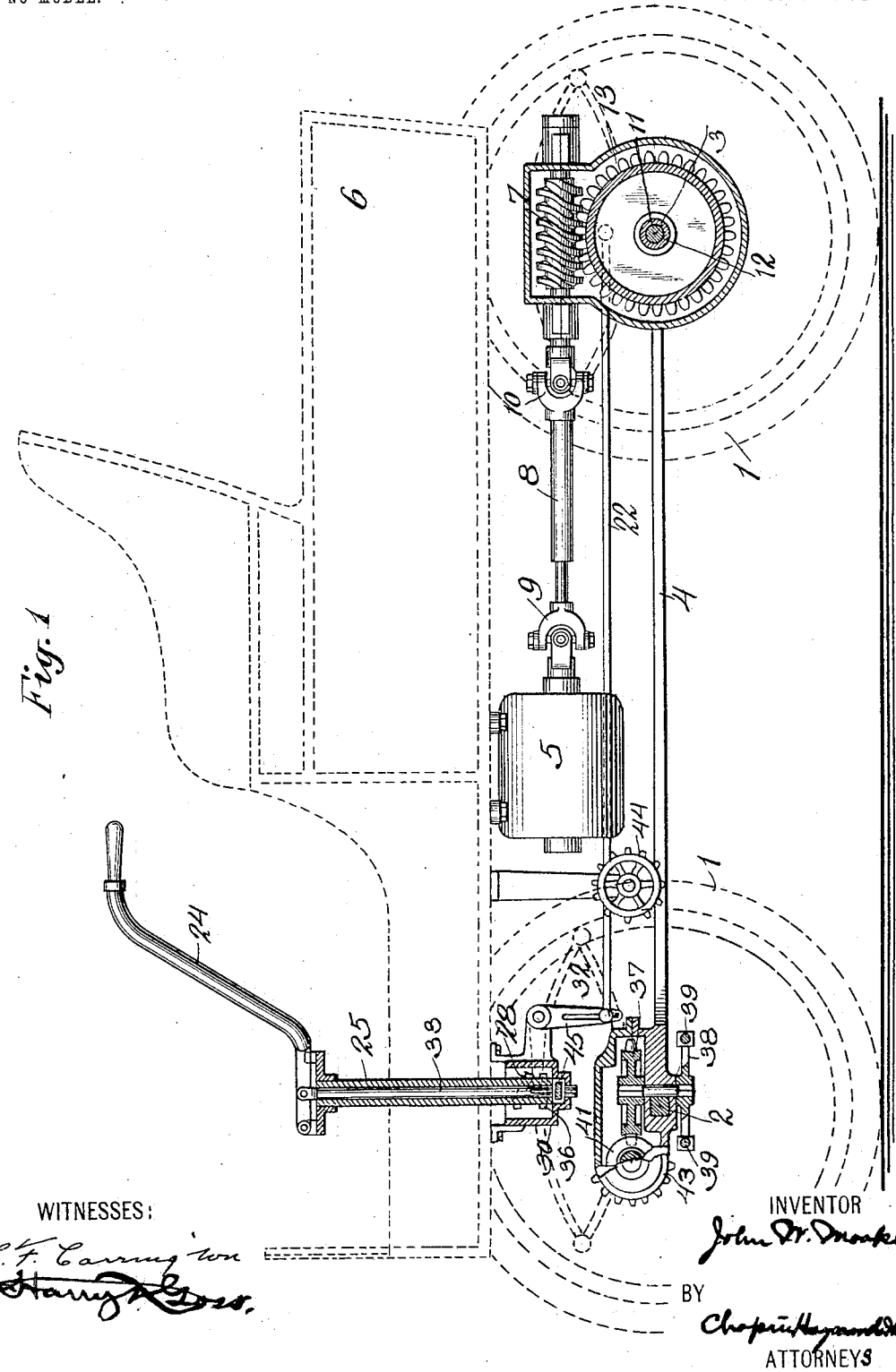

No. 766,191. PATENTED AUG. 2, 1904.
J. W. MOAKLER.
MOTOR VEHICLE.
APPLICATION FILED SEPT. 24, 1903.
NO MODEL. 3 SHEETS—SHEET 1.

WITNESSES: INVENTOR
John W. Moakler
BY
ATTORNEYS

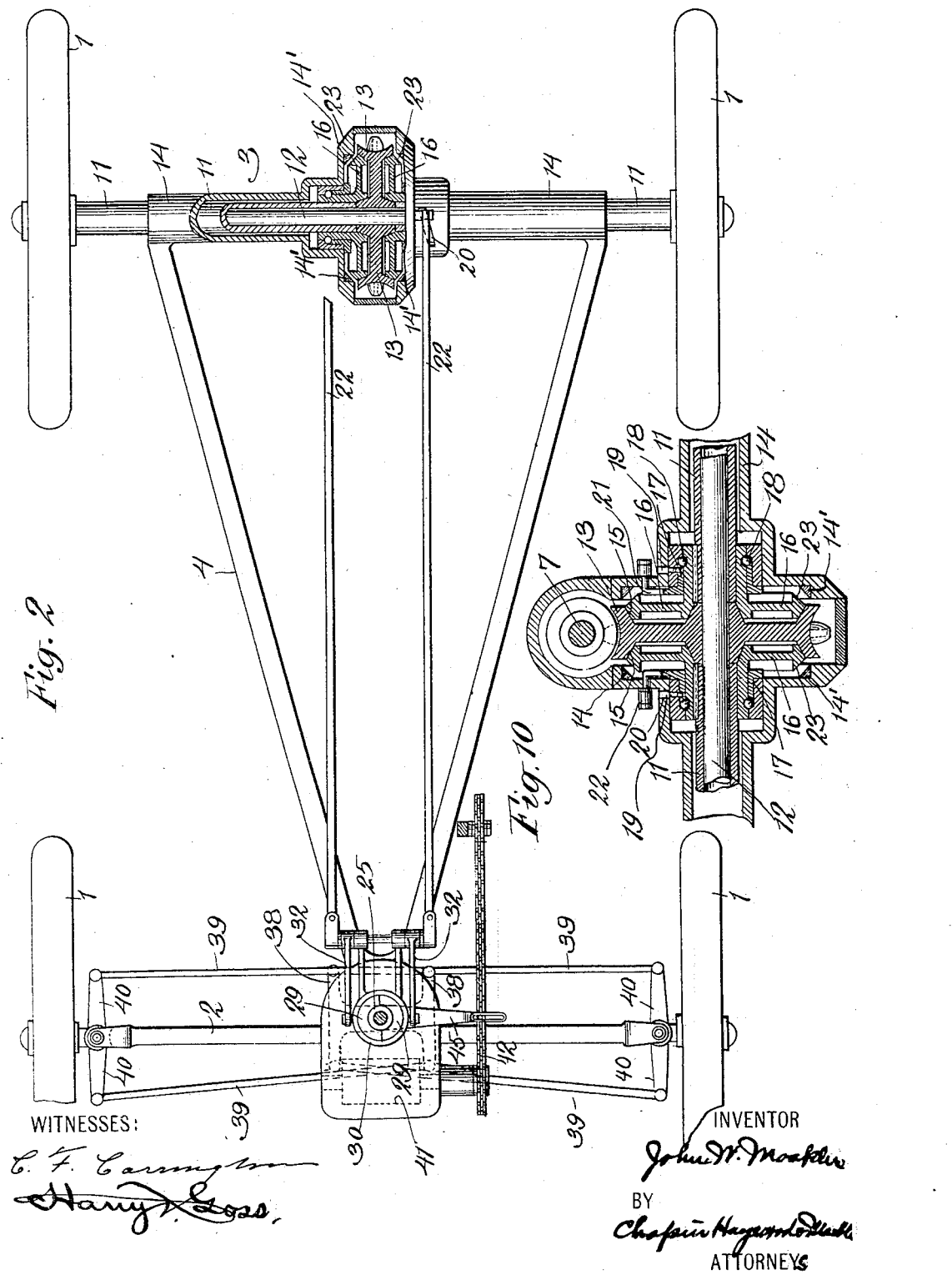

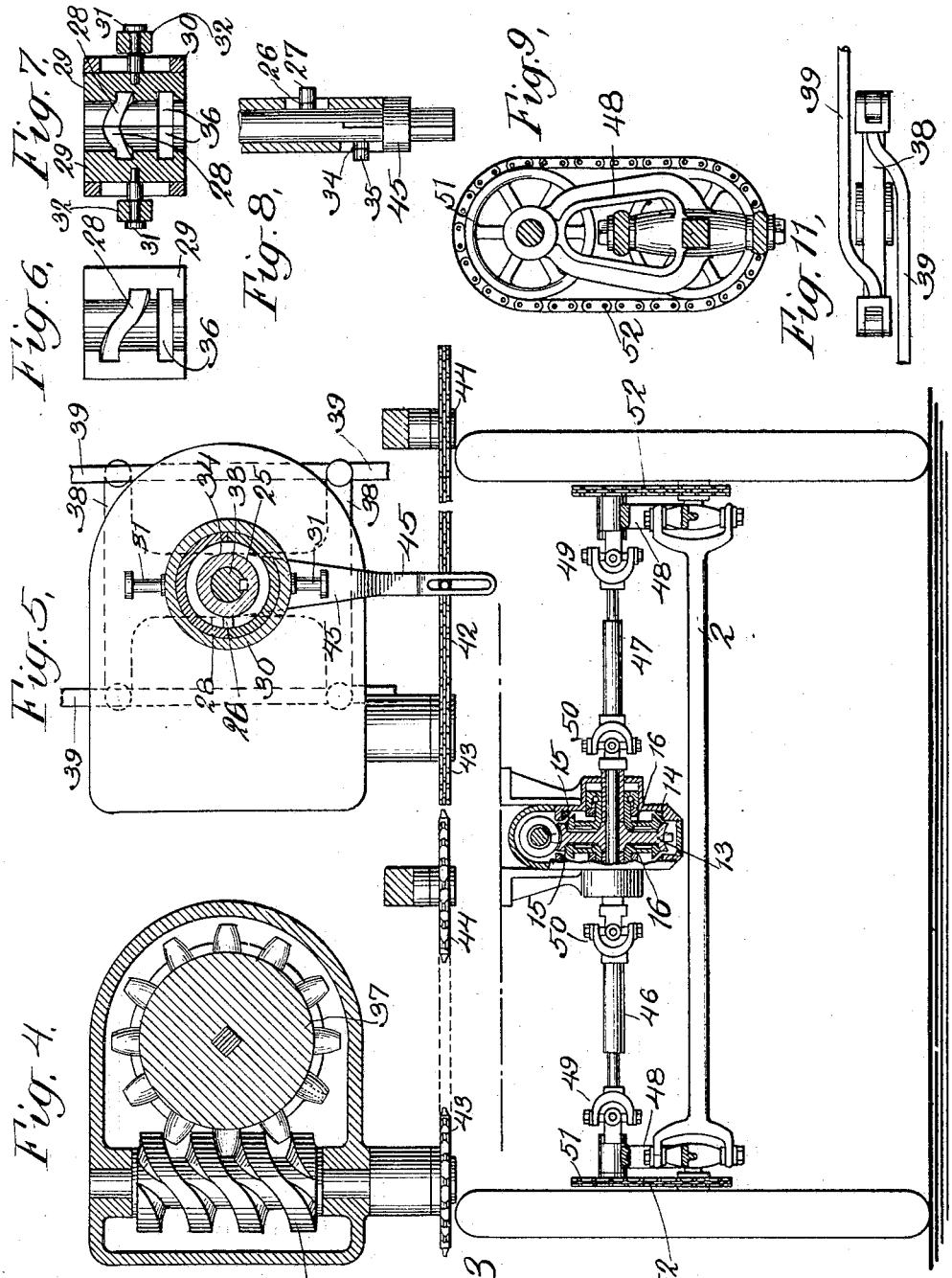

No. 766,191. Patented August 2, 1904.

UNITED STATES PATENT OFFICE.

JOHN WM. MOAKLER, OF NEW YORK, N. Y.

MOTOR-VEHICLE.

SPECIFICATION forming part of Letters Patent No. 766,191, dated August 2, 1904.

Application filed September 24, 1903. Serial No. 174,397. (No model.)

*To all whom it may concern:*

Be it known that I, JOHN WM. MOAKLER, a citizen of the United States, residing in the borough of Manhattan, city, county, and State of New York, have invented certain new and useful Improvements in Motor-Vehicles; and I do hereby declare the following to be a full, clear, and exact description of the invention, such as will enable others skilled in the art to which it appertains to make and use the same.

My invention relates generally to motor-vehicles, and particularly to improvements in driving and steering gears of motor-vehicles; and it consists in novel driving-gear for such vehicles, in novel steering-gear for such vehicles, in means whereby the use of the "differential" or balance gear commonly embodied in the driving-gear of motor-vehicles is avoided, in novel means whereby the driving-motor may be thrown into or out of driving connection with the driving-wheels and a brake applied at will, all by the operation of a single lever, which preferably is the steering-lever, and in various other features of invention, all as pointed out hereinafter in the claims.

The objects of my invention are to improve motor-vehicles, and particularly the driving, steering, and brake gear thereof, to avoid skidding, to avoid the use of the differential or balance gear commonly used, to permit both driving and steering by means of the front wheels of the vehicle, to improve and simplify the controlling mechanism of motor-vehicles, to permit the instantaneous disconnection of the driving-motor and the application of a brake by a single movement of a lever, to improve the transmission-gearing of motor-vehicles and render the same more efficient, and generally to improve and simplify the mechanism of motor-vehicles and render the same more reliable, efficient, and certain in operation.

I will now proceed to describe my invention with reference to the accompanying drawings, in which one form of my invention is illustrated, and will then point out the novel features in claims.

In the said drawings, Figure 1 shows a vertical longitudinal section of a motor-vehicle having driving and steering gear constructed in accordance with my invention, the vehicle being of the rear-driven type. Fig. 2 shows a top view and partial section of the driving and running gear of such vehicle. Fig. 3 shows a front elevation of the running-gear of a front-driven motor-vehicle, the driving-gear being of the same general construction as in the preceding figures except as to differences required to permit steering by the front wheels. Fig. 4 shows a detail horizontal section of the steering mechanism. Fig. 5 shows a top view of the casing of the steering mechanism and a horizontal section through the cam-cage, cams, and shafts of the steering and clutch-actuating devices. Fig. 6 is an elevation of one of the clutch-actuating cams looking from the side adjacent to the companion cam. Fig. 7 shows a vertical section of the cam-cage and cams therein, the cams being sectioned on a plane at right angles to that of Fig. 6. Fig. 8 is a detail view of the steering and cam-actuating shafts, the outer shaft being sectioned vertically. Fig. 9 is a detail view showing the steering-knuckle of a front-driven and front-steering vehicle, such as shown in Fig. 3, the view being taken at right angles to Fig. 3. Fig. 10 shows a central vertical section of the driving mechanism on a larger scale than Figs. 2 and 3. Fig. 11 shows a detail side view of the spider and links of the steering mechanism.

Referring now to the drawings, and at first to Figs. 1 and 2 thereof, the running-gear there shown comprises the usual wheels 1 and axles 2 and 3, which in the gear shown are connected by a reach 4, though the use of a reach is not required. The front or steering wheels are connected to the front axle 2 by means of the usual steering-knuckles.

The driving-motor 5 is preferably supported from the body 6 of the vehicle and may be of any suitable type. The particular motor shown is of the electric type; but a steam or internal-combustion motor may be used instead. Motion is transmitted from the main or driving shaft of this motor to a worm 7 by any suitable means, preferably a propeller-shaft 8 and universal joints 9 and 10, as shown.

The rear axle 3 of the vehicle comprises two hollow "live" axle-sleeves 11, to each of which one of the rear wheels is secured, and an inner axle 12, which is free with respect to both axle-sleeves 11 and carries the worm-wheel 13, which latter is in mesh with the worm 7. The hollow axles 11 have bearings in sleeves 14 of the running-gear, to which the reach 4 and the body-springs are secured.

The worm-wheel 13 forms a member of each of two clutches, preferably of the friction type, for driving the two axle-sleeves 11, means being provided for releasing one of said clutches as soon as the steering-handle is operated to change the course of the vehicle, so that only one wheel of the vehicle is in driving connection with the motor when the vehicle is turning. The use of these clutches permits the omission of the differential or balance gear usually employed. The clutches may be of the cone type, conveniently as such clutches engage or disengage with a very slight movement of the moving member of the clutch. In the construction shown in the drawings the conical recesses of the clutches are formed in the sides of the worm-wheel 13, the cones 15 being on the periphery of disks 16, mounted to slide longitudinally upon the hollow axles 11, but having a splined connection therewith. For shifting these cones sleeves 17 are mounted upon the hubs of disks 16 and are operatively connected thereto by bearing-balls 18, running in races formed in sleeves 17 and disks 16, suitable retaining-rings being provided. The sleeves 17 are provided with pins 19, working in spiral slots 20 in the sleeves 14, and said sleeves are further provided with arms 21, projecting through slots in the sides of the casing surrounding the worm-wheel, which arms are connected by links 22 to operating devices to be described hereinafter. The construction is such that when one of the links is pulled forward and the corresponding sleeve 17 rotated said sleeve will be moved outward, and such motion will be transmitted through the balls 18 to the corresponding clutch-disk 16, thereby disengaging the clutch-cone of such disk from the worm-wheel.

Each disk 16 is further provided with a brake-cone 23, adapted to be brought into frictional contact with a conical friction-ring 14′, carried by the casing of the worm-wheel, by further movement of the disk 16 away from the worm-wheel.

The steering and clutch-operating mechanism of the vehicle comprises a tiller or steering-lever 24, pivotally connected to a hollow steering-shaft 25, so as to be capable of up-and-down movement with respect thereto, and within said hollow shaft is a rod 33, provided near its lower end with a pin 26, having a friction-roller 27, adapted to work within the inclined cam-slots 28 of two semicylindrical cams 29, located within and guided by a cylindrical cam-cage 30. In the sides of this cage are slots in which work pins 31, connecting each cam 29 with a bell-crank lever 32, the other arm of which is connected to one of the links 22 for operating the clutches and brakes of the rear axle. The construction is such that when the steering-lever is turned to one side or the other from the intermediate position the pin 26, entering one of the spiral cam-grooves, raises the corresponding cam, thereby moving the bell-crank lever 32, connected thereto, and the corresponding link 22, thereby releasing the clutch which that link operates at least to an extent sufficient to permit the cone of the clutch to slip enough to permit compensation for the difference in radius of the circles through which the two rear wheels move.

The clutches on the rear axle serve, therefore, to permit the driving-wheels to move at different relative velocities when the vehicle is changing direction, the same as if a differential or balance gear were used. It is well known that skidding of motor-vehicles is due almost entirely to the use of the balance-gear and that it is prevented by so locking the driving-wheels that they must move at the same speed. This is the normal condition in my improved driving mechanism, both driving-wheels being locked by their clutches to the worm-wheel in such manner that both wheels must rotate at the same velocity, independent of the character of the surface over which said wheels are traveling. When turning corners, only one wheel—the outer wheel—is in positive driving engagement with the motor, and therefore there can be no tendency to skid. The rod 33 also carries a pin 34, having a friction-roller 35 working within horizontal slots 36 in the cams 29. When the tiller 24 is central and is raised, both cams are raised by pins 26 and 34, each of which engages a groove of each cam. When the tiller is to one side or the other of the central position and is raised, both cams are raised, one by pin 26 and the other by pin 34. Raising both cams releases both clutches, thereby entirely disconnecting the motor from the driving-wheels. Further lifting of the steering-lever applies both cone-brakes to stop the vehicle.

The cone-brakes act very quickly and powerfully, and for this reason, and also because the motor is disconnected, so that it is not necessary to overcome its momentum, the vehicle may be stopped very quickly by said brakes. The cone-brakes therefore form very efficient emergency-brakes.

To permit the taking up of wear in the clutches, the bell-cranks 32 are slotted.

For steering, the steering-shaft 25 is connected to the steering-knuckles of the front wheels as follows: Within a casing supported by the front axle 2 is mounted a worm-wheel 37, to the shaft of which is connected a spider 38, of H form, connected by crossed links 39 to the usual steering-arms 40 of the steering-knuckles. I preferably provide each knuckle with two steering-arms, one in front and the other in rear, and two links 39 connect each knuckle to the spider of the worm-wheel, thus forming a double connection from the worm-wheel to each knuckle, so that in case one of the links 39 should break, or any of the parts associated with it, the vehicle-wheel controlled thereby will still be held. In one of the duplicate connections from the worm-wheel 37 to the vehicle-wheels some looseness is provided to compensate for slight difference in the degree to which the two connections tend to move said vehicle-wheels. The worm-wheel 37 is driven by means of a worm 41 and a sprocket-chain 42, passing over sprocket-wheels 43 and 44, the former of which is secured to the worm, the latter being an idler which may be supported by any suitable portion of the vehicle, preferably the body or some part moving therewith. The steering-shaft 25 is provided with an arm 45, having a slotted connection to one link of this sprocket-chain, so that by the movement of said shaft the chain is moved backward and forward, thus rotating the worm and worm-wheel and thereby moving the vehicle-wheels. In this steering mechanism the sprocket-chain by reason of its flexibility supplies the play necessary to prevent slight movement of the carriage-body due to its spring support from affecting both the steering-handle and the steering-wheels of the vehicle. The worm being double-threaded with a high pitch and the worm-wheel having roller-teeth, the friction is very low, and the worm-gearing is not irreversible, but nevertheless offers sufficient resistance to movement imparted from the steering-wheels to the steering-handle to very greatly assist in holding the steering-wheels true, thus avoiding the fatigue commonly experienced with steering-gears which are not irreversible.

In the operation of my improved driving and steering gear as soon as the steering-lever is moved to one side or the other to change the direction of motion of the vehicle the clutch of that driving-wheel which is on the inside is released partly or completely, thus permitting that driving-wheel to rotate with the speed appropriate to the radius of the path through which it is moving. As soon as the steering-handle is returned to normal position the clutch, which has been released, is closed again, and both wheels become effective for driving. If it be desired to throw out the motor, the steering-handle is raised slightly, thus raising both cams 29 and releasing both driving-clutches, and this may be done at any time, no matter whether the vehicle is moving straight ahead or is turning, and if it is desired to apply the brakes a further upward movement of the steering-handle does so. By lowering the steering-handle to its normal position the brakes are released and the motor thrown into gear with the driving-wheels again. It will be seen, therefore, that my invention permits the starting, stopping, and steering of the vehicle by a single operating-lever.

The improved driving-gear herein described is also applicable to front-driven vehicles, and my invention contemplates such use and also the use of improved means permitting the steering of the vehicle by the front wheels when they are used also as driving-wheels. This is illustrated in Fig. 3. The arrangement of the worm-gear and the parts of the clutches and brakes is the same as above described and does not require redescription. The worm-wheel drives, through the clutches, a two-part counter-shaft, the two sections 46 and 47 of which have bearings at one end in the casing of the driving-clutches and at the other end have bearings in extensions 48 of the steering-knuckles. The casing of the driving-clutches being carried by the body of the vehicle, universal joints 49 and 50 are interposed in each section of the counter-shaft, the axes of the joints 50 being as nearly as possible in line with the axes of the knuckle-pivots. Since it is not possible ordinarily to have these two axes exactly in line, I provide each section of the counter-shaft with a telescopic joint, which will permit slight changes in the length of the shaft. By this construction the outer ends of the counter-shaft sections are always parallel with the stub-axles on which the front wheels of the vehicle are mounted. These shaft ends carry sprocket-wheels 51, which transmit motion to the vehicle-wheels by means of sprocket-chains 52 and sprocket-wheels 53, carried by the vehicle-wheels. This construction therefore permits the use of the front wheels both as driving and as steering wheels. The advantages of this are well known.

I preferably employ both in the steering-gear and in the driving mechanisms herein described worm-gears such as illustrated, described, and claimed in another application for patent, filed September 8, 1903, Serial No. 172,278, the teeth of which gears are provided with friction-rollers having the sectional contour of a worm-wheel tooth. Such gears run smoothly and with very little friction.

The worm-wheel 37 of the steering mechanism is connected to its shaft 54, on which the arms 38 are mounted, by means of a squared end, and in case a tooth of said worm-wheel should be broken or wear should develop the worm-wheel may be taken off its shaft, rotated a quarter-turn, and put back again, thus bringing a new set of teeth into action.

It is obvious that the mechanism herein described is only one embodiment of my invention and that the invention is susceptible of many variations and modifications in form, construction, and arrangement of the parts without departing from the essential features. I do not limit myself to the particular details of form, construction, and arrangement herein illustrated and described.

What I claim is—

1. In a motor-vehicle, the combination with vehicle-wheels, and means for driving the same, of power-transmitting means for transmitting power from said driving means to each wheel independently of the other, braking means, and a single operating device arranged to free one or both of said wheels and to operate said braking means at will.

2. In a motor-vehicle, the combination with vehicle-wheels, and means for driving the same, of power-transmitting means for transmitting power from said driving means to said wheels, braking means, steering mechanism, and a single operating device for operating said steering mechanism, arranged likewise to release one of said wheels when the vehicle changes direction, or at will to release both said wheels and operate said braking mechanism.

3. In a motor-vehicle, the combination with driving means, and two wheel-driving shafts, of means for transmitting power from said driving means to said shafts, arranged to free either or both said shafts at will, braking means, and a single operating device for operating said power-transmitting and said braking means.

4. In a motor-vehicle, the combination with driving means, and two wheel-driving shafts, of clutches for transmitting power from said driving means to said shafts, braking means, and a single operating device arranged to release one or both of said clutches and operate said braking means, at will.

5. In a motor-vehicle, the combination with driving means, and two wheel-driving shafts, of means for transmitting power from said driving means to said shafts, arranged to free either or both said shafts at will, braking means, steering mechanism, and a single operating device for operating said steering mechanism, arranged likewise to release one of said shafts when the vehicle changes direction, or at will to release both said shafts and operate said braking means.

6. In a motor-vehicle, the combination with driving means, and two wheel-driving shafts, of clutches for transmitting power from said driving means to said shafts, braking means, steering mechanism, and a single operating device for operating said steering mechanism, arranged likewise to release one of said clutches when the vehicle changes direction, or at will to release both said clutches and operate said braking mechanism.

7. In a motor-vehicle, the combination with a driving-wheel, wheel-driving shafts on opposite sides thereof, and clutches for transmitting motion thereto comprising clutch members connected to said shafts but movable axially thereon, and arranged to coact with clutch members carried by the driving-wheel, of means automatically operated for releasing one or the other of said clutches when the vehicle changes direction.

8. In a motor-vehicle, the combination with a driving-wheel, wheel-driving shafts on opposite sides thereof, clutches for transmitting motion thereto comprising clutch members connected to said shafts and movable axially thereon, and arranged to coact with clutch members carried by the driving-wheel, and braking means likewise adapted to coact with said movable clutch members, of means for releasing either or both said clutches and for bringing the movable clutch members into coaction with said braking means.

9. In a motor-vehicle, the combination with a driving-wheel, wheel-driving shafts on opposite sides thereof, clutches for transmitting motion thereto comprising clutch members connected to said shafts and movable axially thereon, and arranged to coact with clutch members carried by the driving-wheel, braking means likewise adapted to coact with said movable clutch members, steering mechanism, and a single operating device therefor adapted likewise to release one or the other of said clutches when the vehicle changes direction, or at will to release both said clutches and to bring said movable clutch members into coaction with said braking means.

10. In a motor-vehicle, the combination with a driving-wheel provided on opposite sides with tapering clutch-recesses, wheel-driving shafts on opposite sides of said wheel, and clutch-cones connected to said shafts but movable axially thereon, of means for moving said cones into and out of engagement with said wheel.

11. In a motor-vehicle, the combination with a driving-wheel provided on opposite sides with tapering clutch-faces, wheel-driving shafts on opposite sides of said wheel, tapering brake-faces on opposite sides of said wheel, and tapering clutch members connected to said shafts but movable axially thereon, of means for moving said clutch members into engagement with said clutch-faces or brake-faces, at will.

12. In a motor-vehicle, the combination with a driving-wheel provided on opposite sides with tapering clutch-faces, wheel-driving shafts on opposite sides of said wheel, a casing surrounding said wheel, and provided, on both sides, with tapering brake-faces, and tapering clutch members connected to said shafts but movable axially thereon, of means for moving said clutch members into engagement with said clutch-faces or brake-faces, at will.

13. In a motor-vehicle, the combination with a driving-wheel provided on opposite sides with tapering clutch-faces, wheel-driving shafts on opposite sides of said wheel, tapering clutch members connected to said shafts but movable axially thereon, and sleeves surrounding portions of said clutch members and operatively connected therewith to move them axially, of screw mechanism for moving said sleeves and the clutch members axially.

14. In a motor-vehicle, the combination with a driving-wheel provided on opposite sides with tapering clutch-faces, wheel-driving shafts on opposite sides of said wheel, tapering clutch members connected to said shafts but movable axially thereon, and sleeves surrounding portions of said clutch members, said sleeves and clutch members having registering ball-races, of balls in said races operatively connecting the sleeves and clutch members, and means for moving said sleeves axially.

15. In a motor-vehicle, the combination with a driving-wheel provided on opposite sides with tapering clutch-faces, wheel-driving shafts on opposite sides of said wheel, tapering clutch members connected to said shafts but movable axially thereon, and sleeves surrounding portions of said clutch members, said sleeves and clutch members having registering ball-races, of balls in said races operatively connecting the sleeves and clutch members, a stationary member having in it spiral cam-slots, and pins carried by said sleeves and working in said slots.

16. In a motor-vehicle, the combination with wheel-driving shafts, and means for driving the same comprising clutches adapted to release either of said shafts independently of the other, of steering mechanism, a steering-shaft for operating the same, and means operated by said steering-shaft for releasing one or the other of said clutches when the vehicle changes direction.

17. In a motor-vehicle, the combination with wheel-driving shafts, and means for driving the same comprising clutches adapted to release either of said shafts independently of the other, of steering mechanism, a steering-shaft for operating the same, and cam mechanism operated thereby arranged to release one or the other of said clutches according to the direction in which said shaft is rotated from normal position.

18. In a motor-vehicle, the combination with wheel-driving shafts, and means for driving the same comprising clutches adapted to release either of said shafts independently of the other, of steering mechanism, a steering-shaft for operating the same, two cams having spiral cam-grooves, means for guiding said cams, a pin carried by said steering-shaft arranged to enter one or the other of said cam-grooves according to the direction in which said shaft is moved from normal position, and means operated by each of said cams for releasing its corresponding clutch.

19. In a motor-vehicle, the combination with a steering-shaft, and a cam-cage surrounding the same, of cams within and guided by said cage, and having spiral cam-grooves, a pin on said shaft arranged to enter one or the other of said grooves according to the direction in which said shaft is rotated from normal position, two clutches, corresponding each to one of said cams, for driving vehicle-wheels independently, and means operated by each cam for releasing its corresponding clutch.

20. In a motor-vehicle, the combination with a steering-shaft, and a cam-cage surrounding the same of cams within and guided by said cage, and having spiral cam-grooves, a pin on said shaft arranged to enter one or the other of said grooves according to the direction in which said shaft is rotated from normal position, two clutches, corresponding each to one of said cams, for driving vehicle-wheels independently, means operated by each cam for releasing its corresponding clutch, and means for operating both cams simultaneously to release both said clutches.

21. In a motor-vehicle, the combination with two wheel-driving shafts, clutches for driving said shafts independently, and separate brakes for said shafts, of a steering-shaft, cam mechanism operated thereby to release one or the other of said clutches according to the direction of motion of said shaft, and means for releasing both of said clutches simultaneously and applying said brakes.

22. In a motor-vehicle, the combination with two wheel-driving shafts, clutches for driving said shafts independently, and separate brakes for said shafts, of a steering-shaft, two cams having spiral grooves, means for guiding said cams, a pin carried by said steering-shaft arranged to enter one or the other of said cam-grooves according to the direction in which said shaft is rotated from normal position, means operated by each cam for releasing its corresponding clutch, and means for operating both of said cams simultaneously and releasing the clutches and applying the brakes.

23. In a motor-vehicle, the combination with a hollow steering-shaft, a rod within the same, a tiller connected to said shaft and rod, and movable in one direction to rotate said shaft and in another direction to move said rod axially, two cams having spiral grooves and straight grooves, means for guiding said cams, a pin carried by said shaft adapted to enter one or the other of said spiral grooves according to the direction of rotation of the shaft from normal position, a pin carried by said rod engaging the straight grooves and arranged to move both cams simultaneously when the rod is moved axially, two clutches for driving vehicle-wheels independently, a brake for each wheel, and means operated by each cam for releasing its corresponding clutch and applying its corresponding brake.

24. In a motor-vehicle, the combination with an axle provided at its ends with pivoted stub-axles or steering-knuckles, a worm-wheel, means connecting the same with said knuckles, and a worm, of a sprocket-chain, two sprocket-wheels therefor, one secured to said worm, a steering-shaft, and means operated thereby for operating said chain.

25. In a motor-vehicle, the combination with a worm-wheel, means operated thereby for steering the vehicle, and a worm, of a steering-shaft, and gearing connecting the same to said worm to operate the latter.

26. In a motor-vehicle, the combination with an axle provided at its ends with pivoted stub-axles or steering-knuckles, of a counter-shaft universally jointed at points in proximity to the pivotal points of said knuckles, means for driving said counter-shaft, and means for communicating motion from the universally-jointed sections thereof to vehicle-wheels on said stub-axles.

27. In a motor-vehicle, the combination with an axle provided at its ends with pivoted stub-axles or steering-knuckles, of a counter-shaft in substantially the same vertical plane as said axle, having ends connected thereto by universal joints located substantially above the pivotal points of said stub-axles, means for driving said counter-shaft, and means for communicating motion from the universally-jointed ends thereof to vehicle-wheels on said stub-axles.

28. In a motor-vehicle, the combination with an axle provided at its ends with pivoted stub-axles or steering-knuckles, of a two-part counter-shaft in substantially the same vertical plane as said axle, each section of said axle having an end connected thereto by a universal joint located in proximity to the pivotal point of the corresponding knuckle, means for driving said counter-shaft, arranged to permit relative motion of one section thereof with respect to the other, and means for communicating motion from the universally-jointed ends of said shaft to vehicle-wheels on said stub-axles.

29. In a motor-vehicle, the combination with running-gear comprising an axle provided at its ends with pivoted stub-axles or steering-knuckles, a spring-support for a motor, a two-part counter-shaft, each section of said shaft having one end mounted in a bearing carried by said spring-support and the other end mounted in a bearing in the corresponding steering-knuckle, and having universal joints between the said bearings, means for driving said counter-shaft, and means for communicating motion from the outer portions of said counter-shaft sections to vehicle-wheels on said stub-shafts.

In testimony whereof I affix my signature in the presence of two witnesses.

JOHN WM. MOAKLER.

Witnesses:
H. M. MARBLE,
C. F. CARRINGTON.